(12) United States Patent
Zhang et al.

(10) Patent No.: US 11,194,435 B2
(45) Date of Patent: Dec. 7, 2021

(54) DETECTION SUBSTRATE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Lianghao Zhang, Beijing (CN); Wenchao Han, Beijing (CN); Yilin Feng, Beijing (CN); Mingming Wang, Beijing (CN); Xin Duan, Beijing (CN); Xiaoyang Shen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/840,400

(22) Filed: Apr. 5, 2020

(65) Prior Publication Data

US 2021/0165532 A1 Jun. 3, 2021

(30) Foreign Application Priority Data

Nov. 28, 2019 (CN) .......................... 201911192215.7

(51) Int. Cl.
*G06F 3/044* (2006.01)
(52) U.S. Cl.
CPC .......... *G06F 3/0448* (2019.05); *G06F 3/0446* (2019.05)

(58) Field of Classification Search
CPC .............................. G06F 3/0448; G06F 3/0446
See application file for complete search history.

(56) References Cited

U.S. PATENT DOCUMENTS

| 2011/0018838 | A1* | 1/2011 | Lee ........................ | G06F 3/0446 |
| | | | | 345/174 |
| 2016/0266675 | A1* | 9/2016 | Yang ...................... | G06F 3/0412 |
| 2016/0357337 | A1* | 12/2016 | Li ........................... | G06F 3/0448 |
| 2017/0192565 | A1* | 7/2017 | Pan ........................ | G02B 6/0083 |
| 2017/0229522 | A1* | 8/2017 | Cai ......................... | H01L 27/323 |
| 2017/0255310 | A1* | 9/2017 | Miyamoto ............ | G06F 3/0448 |
| 2018/0373366 | A1* | 12/2018 | Li ........................... | H01L 25/13 |

\* cited by examiner

*Primary Examiner* — Amit Chatly
(74) *Attorney, Agent, or Firm* — Leason Ellis LLP

(57) ABSTRACT

A detection substrate and a display device are disclosed. The detection substrate includes an outer detection electrode and an inner detection electrode on a base substrate and insulated from each other. The outer detection electrode has a hollowed portion, and the hollowed portion corresponds to the inner detection electrode. The inner detection electrode includes a body portion and a plurality of protrusion portions protruding from the body portion and extending in directions away from the body portion. The edge of the hollowed portion includes a curved portion, an orthographic projection of the curved portion on the base substrate protrudes into a region between orthographic projections of at least two adjacent protrusion portions of the plurality of protrusion portions on the base substrate, a portion of the orthographic projection of the curved portion is closer to an orthographic projection of the body portion on the base substrate.

20 Claims, 9 Drawing Sheets

DETECTION SUBSTRATE AND DISPLAY DEVICE

CROSS-REFERENCE TO RELATED APPLICATION

The present application claims the priority of Chinese patent application No. 201911192215.7 filed on Nov. 28, 2019, and for all purpose under the U.S. laws, the entire disclosure of the aforementioned application is incorporated herein by reference as part of the present application.

TECHNICAL FIELD

Embodiments of the present disclosure relate to a detection substrate and a display device.

BACKGROUND

Touch screens are everywhere around us. The touch screen saves space for portability, and further has better human-computer interaction performance. Among various types of touch screens, capacitive touch screens are widely used due to their advantages, such as strong sensitivity, multipoint touch capability, and the like.

The working principle of the capacitive touch screens includes that a conductive material is provided on a surface of a substrate as a touch electrode, and in the case where a touch object (for example, a user's finger) touches the touch screen, a capacitance of a touch electrode located at a touch point changes, and a position of the touch point on the touch screen can be detected according to the change.

For example, the capacitive touch screens include a self-capacitance touch screen and a mutual capacitance touch screen. Outputting and receiving of an excitation signal of the self-capacitance touch screen is completed by a self-capacitance electrode. The mutual capacitance touch screen includes, for example, a plurality of strip-shaped touch driving electrodes and a plurality of strip-shaped touch sensing electrodes. An extension direction of the touch driving electrode intersects with an extension direction of the touch sensing electrode. The touch driving electrode sends an excitation signal, the touch sensing electrode receives the excitation signal, and a detection circuit can determine a touch position by detecting a change in mutual capacitance between the touch driving electrode and the touch sensing electrode.

SUMMARY

At least one embodiment of the present disclosure provides a detection substrate, which comprises a base substrate, at least one outer detection electrode, and at least one inner detection electrode, the at least one outer detection electrode and the at least one inner detection electrode are on the base substrate, and the at least one outer detection electrode is insulated from the at least one inner detection electrode. The at least one outer detection electrode has at least one hollowed portion, the at least one hollowed portion corresponds to the at least one inner detection electrode, and at least one orthographic projection of the at least one inner detection electrode on the base substrate respectively overlaps with at least one region respectively surrounded by at least one orthographic projection of at least one edge of the at least one hollowed portion on the base substrate. Each inner detection electrode comprises a body portion and a plurality of protrusion portions protruding from the body portion and extending in directions away from the body portion. The edge of each hollowed portion comprises a curved portion, an orthographic projection of the curved portion on the base substrate protrudes into a region between orthographic projections of at least two adjacent protrusion portions of the plurality of protrusion portions on the base substrate, a portion of the orthographic projection of the curved portion is closer to an orthographic projection of the body portion on the base substrate than top ends of the orthographic projections of the adjacent protrusion portions, and the top ends of the orthographic projections of the adjacent protrusion portions are end portions, away from the orthographic projection of the body portion, of the orthographic projections of the adjacent protrusion portions.

For example, in the detection substrate provided by at least one embodiment of the present disclosure, each outer detection electrode has an integrated structure, and each outer detection electrode has a plurality of hollowed portions that are spaced apart from each other; and the at least one inner detection electrode includes a plurality of inner detection electrodes respectively corresponding to the plurality of hollowed portions.

For example, in the detection substrate provided by at least one embodiment of the present disclosure, the at least one outer detection electrode comprises a plurality of outer detection electrodes insulated from each other, and the plurality of inner detection electrodes comprise a plurality of inner detection electrode groups on the base substrate and insulated from each other; each of the inner detection electrode groups comprises a plurality of inner detection electrodes which are spaced apart from each other and respectively in one-to-one correspondence with the plurality of hollowed portions of at least one of the outer detection electrode, so that each of the inner detection electrode groups corresponds to the at least one of the outer detection electrode; and inner detection electrodes in a same inner detection electrode group are electrically connected to each other, and inner detection electrodes in different inner detection electrode groups are insulated from each other.

For example, the detection substrate provided by at least one embodiment of the present disclosure further comprises a detection circuit. The plurality of outer detection electrodes include a first outer detection electrode, and the plurality of inner detection electrode groups include a first inner detection electrode group corresponding to the first outer detection electrode; the detection substrate comprises a first detection region, the first detection region is provided with the first outer detection electrode, the first inner detection electrode group, a first outer detection lead, and a first inner detection lead, and the first outer detection lead is insulated from the first inner detection lead; the first outer detection electrode is electrically connected to the detection circuit through the first outer detection lead; and the first inner detection electrode group is electrically connected to the detection circuit through the first inner detection lead, the first inner detection lead comprises a plurality of first sub-leads in parallel with each other and comprises a second sub-lead electrically connected to the plurality of first sub-leads, the plurality of first sub-leads are electrically connected to inner detection electrodes comprised in the first inner detection electrode group, and the plurality of first sub-leads are electrically connected to the detection circuit through the second sub-lead.

For example, in the detection substrate provided by at least one embodiment of the present disclosure, the second sub-lead is electrically connected to end portions, close to the detection circuit, of the plurality of first sub-leads.

For example, in the detection substrate provided by at least one embodiment of the present disclosure, an extension direction of the first outer detection lead is consistent with an extension direction of one of the first sub-leads of the first inner detection lead.

For example, in the detection substrate provided by at least one embodiment of the present disclosure, one of the first outer detection electrode and an inner detection electrode of the first inner detection electrode group is a touch sensing electrode and the other is a touch driving electrode.

For example, in the detection substrate provided by at least one embodiment of the present disclosure, the plurality of outer detection electrodes comprise a second outer detection electrode, and the plurality of inner detection electrode groups comprise a second inner detection electrode group corresponding to the second outer detection electrode; the detection substrate comprises a second detection region, the second detection region is provided with the second outer detection electrode, the second inner detection electrode group, a second outer detection lead, and a second inner detection lead, and the second outer detection lead is insulated from the second inner detection lead; the second outer detection electrode is electrically connected to the detection circuit through the second outer detection lead; and the second inner detection electrode group is electrically connected to the second inner detection lead, the second inner detection lead is electrically connected to the detection circuit, the second inner detection lead comprises a plurality of third sub-leads in parallel with each other, the plurality of third sub-leads are electrically connected to inner detection electrodes comprised in the second inner detection electrode group, the plurality of third sub-leads are electrically connected to the first outer detection electrode, so that the second inner detection electrode group is electrically connected to the detection circuit through the second inner detection lead, the first outer detection electrode, and the first outer detection lead.

For example, in the detection substrate provided by at least one embodiment of the present disclosure, the second inner detection lead further comprises a fourth sub-lead, and the plurality of third sub-leads are electrically connected to the first outer detection electrode through the fourth sub-lead.

For example, in the detection substrate provided by at least one embodiment of the present disclosure, both the first outer detection electrode and inner detection electrodes in the second inner detection electrode group are configured to function as one of a touch driving electrode and a touch sensing electrode, and both the second outer detection electrode and inner detection electrodes in the first inner detection electrode group are configured to function as the other of the touch driving electrode and the touch sensing electrode.

For example, in the detection substrate provided by at least one embodiment of the present disclosure, the detection substrate further comprises a plurality of signal lines arranged in a sequence, orthographic projections of the plurality of signal lines on the base substrate overlap with an orthographic projection of the outer detection electrode on the base substrate, the inner detection electrodes corresponding to the plurality of hollowed portions are arranged into a plurality of inner detection electrode queues, each of the inner detection electrode queues comprises at least two inner detection electrodes, and each of the inner detection electrode queues extends along an arrangement direction of the plurality of signal lines; and the plurality of inner detection electrode queues comprise a first inner detection electrode queue and a second inner detection electrode queue that are sequentially arranged along an extension direction of the plurality of signal lines, the extension direction of the plurality of signal lines is different from the arrangement direction of the plurality of signal lines, and inner detection electrodes of the second inner detection electrode queue and inner detection electrodes of the first inner detection electrode queue are staggered in the arrangement direction of the plurality of signal lines.

For example, in the detection substrate provided by at least one embodiment of the present disclosure, an orthographic projection of each of the signal lines on the base substrate overlaps with the orthographic projection of the outer detection electrode on the base substrate, and overlaps with orthographic projections of a part of the inner detection electrodes corresponding to the plurality of hollowed portions on the base substrate.

For example, in the detection substrate provided by at least one embodiment of the present disclosure, an area of overlapping regions, where the orthographic projections of respective the signal lines overlap with the orthographic projection of the outer detection electrode, is equal to an area of overlapping regions, where the orthographic projections of the respective the signal lines overlap with the orthographic projection of the part of the inner detection electrodes.

For example, in the detection substrate provided by at least one embodiment of the present disclosure, a shape of the orthographic projection of the edge of each hollowed portion is a closed shape.

For example, in the detection substrate provided by at least one embodiment of the present disclosure, the orthographic projection of each inner detection electrode is L-shaped or T-shaped or cross-shaped; or, the orthographic projection of each inner detection electrode has 4+n protrusion portions, and n≥1.

For example, in the detection substrate provided by at least one embodiment of the present disclosure, the at least one outer detection electrode and the at least one inner detection electrode are arranged on the base substrate side by side.

For example, in the detection substrate provided by at least one embodiment of the present disclosure, one of the outer detection electrode and the inner detection electrode is a touch driving electrode and the other of the outer detection electrode and the inner detection electrode is a touch sensing electrode.

An embodiment of the present disclosure further provides a detection substrate comprising a base substrate, a plurality of detection units on the base substrate, and a plurality of signal lines arranged in a sequence on the base substrate. Each of the detection units comprises an outer detection electrode and an inner detection electrode, the outer detection electrode has a hollowed portion, the hollowed portion corresponds to the inner detection electrode, and an orthographic projection of the inner detection electrode on the base substrate overlaps with a region surrounded by an orthographic projection of an edge of the hollowed portion on the base substrate; orthographic projections of the plurality of signal lines on the base substrate overlap with orthographic projections of the plurality of detection units on the base substrate; the plurality of detection units comprise a first detection unit queue and a second detection unit queue that are sequentially arranged along an extension direction of the plurality of signal lines, the first detection unit queue and the second detection unit queue both comprise at least two detection units and both extend along an arrangement direction of the plurality of signal lines, and the arrangement direction of the plurality of signal lines is different from the extension direction of the plurality of signal lines; and inner detection electrodes of the second detection unit queue and inner detection electrodes of the first detection unit queue are staggered in the arrangement direction of the plurality of signal lines.

For example, in the detection substrate provided by at least one embodiment of the present disclosure, outer detection electrodes of the first detection unit queue are directly connected to outer detection electrodes of the second detection unit queue.

An embodiment of the present disclosure further provides a display device comprising the detection substrate which comprises a base substrate, at least one outer detection electrode, and at least one inner detection electrode; the at least one outer detection electrode and the at least one inner detection electrode are on the base substrate, and the at least one outer detection electrode is insulated from the at least one inner detection electrode, the at least one outer detection electrode has at least one hollowed portion, the at least one hollowed portion corresponds to the at least one inner detection electrode, and at least one orthographic projection of the at least one inner detection electrode on the base substrate respectively overlaps with at least one region respectively surrounded by at least one orthographic projection of at least one edge of the at least one hollowed portion on the base substrate; each inner detection electrode comprises a body portion and a plurality of protrusion portions protruding from the body portion and extending in directions away from the body portion; and the edge of each hollowed portion comprises a curved portion, an orthographic projection of the curved portion on the base substrate protrudes into a region between orthographic projections of at least two adjacent protrusion portions of the plurality of protrusion portions on the base substrate, a portion of the orthographic projection of the curved portion is closer to an orthographic projection of the body portion on the base substrate than top ends of the orthographic projections of the adjacent protrusion portions, and the top ends of the orthographic projections of the adjacent protrusion portions are end portions, away from the orthographic projection of the body portion, of the orthographic projections of the adjacent protrusion portions.

BRIEF DESCRIPTION OF DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
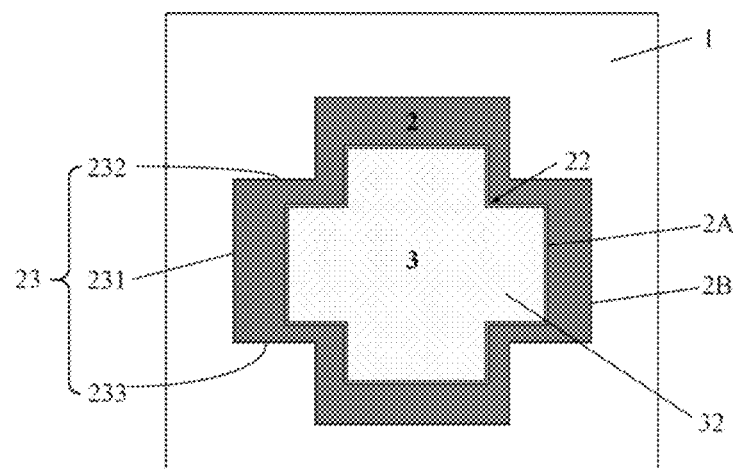
FIG. 1A is a schematic top view of an outer detection electrode and an inner detection electrode in a detection substrate provided by at least one embodiment of the present disclosure.
Figure 1B:
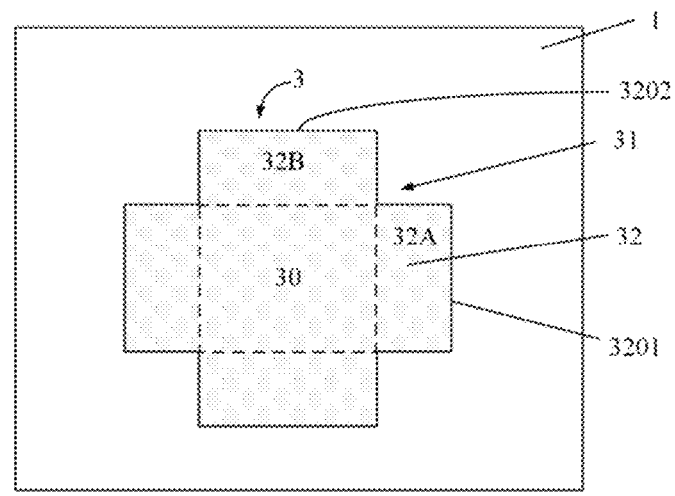
FIG. 1B is a schematic top view of the inner detection electrode as shown in FIG. 1A.
Figure 1C:
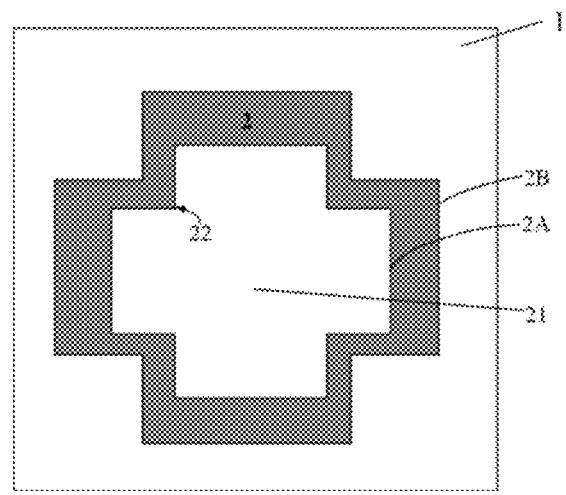
FIG. 1C is a schematic top view of the outer detection electrode as shown in FIG. 1A.
Figure 1D:
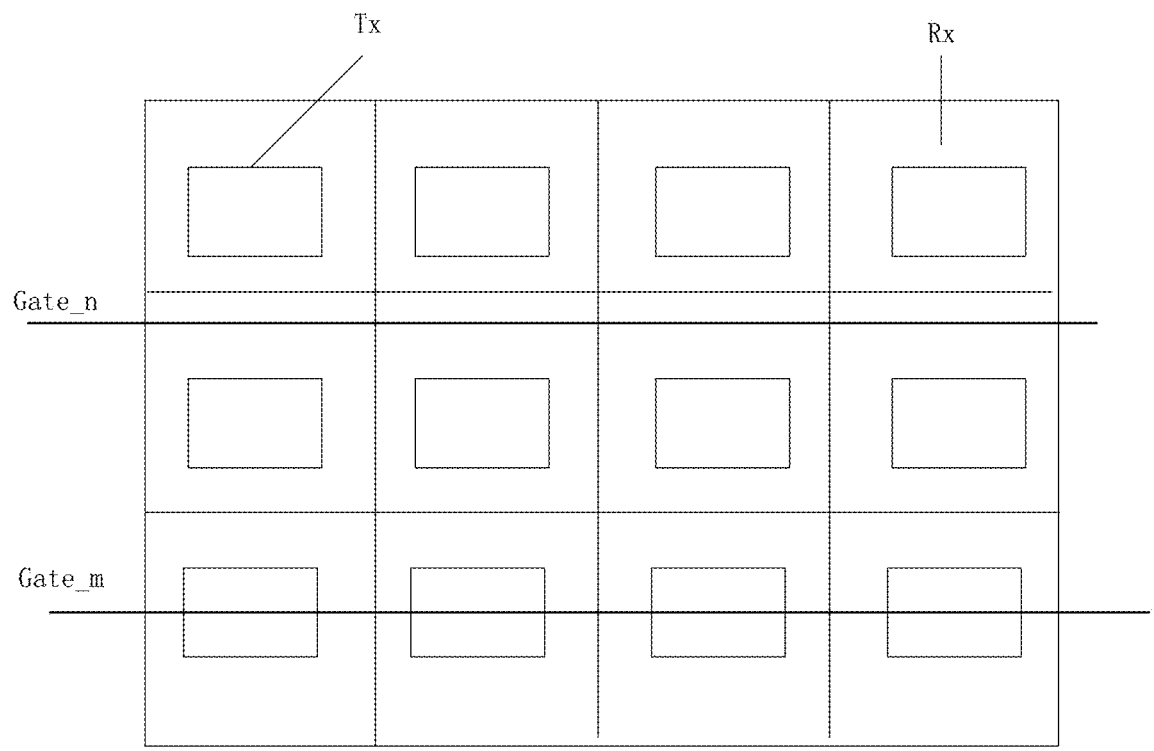
FIG. 1D is a schematic diagram of a touch display panel.

At present, as shown in FIG. 1D, areas of overlapping regions of respective signal lines and a touch unit (for example, the touch unit includes a touch sensing electrode Rx and a touch driving electrode Tx) are different, for example, a parasitic capacitance of the sensing electrode Rx corresponding to one pixel and a first signal line Gate_n is C1, a resolution of a touch display panel is 3840(RGB) *2160, as shown in FIG. 1D, the first signal line Gate_n corresponds to the touch sensing electrode Rx, so a number of the parasitic capacitance between the first signal line Gate_n and the touch display panel is 3840*3*C1, and a second signal line Gate_m corresponds to the touch sensing electrode Rx and the touch driving electrode Tx of the touch display panel, so a number of the parasitic capacitance between the second signal line Gate_m and the touch display panel is 1920*C1. The difference of the number of the parasitic capacitance between the above two case is too large, so touch sensing signals received by the respective touch sensing electrodes are pulled to different degrees, thus generating transverse mura.

Embodiments of the present disclosure provide a detection substrate and a display device including the detection substrate.

In some embodiments, the detection substrate includes a base substrate, at least one outer detection electrode, and at least one inner detection electrode; the at least one outer detection electrode and the at least one inner detection electrode are on the base substrate, and the at least one outer detection electrode is insulated from the at least one inner detection electrode, the at least one outer detection electrode has at least one hollowed portion, the at least one hollowed portion corresponds to the at least one inner detection electrode, and at least one orthographic projection of the at least one inner detection electrode on the base substrate respectively overlaps with at least one region respectively surrounded by at least one orthographic projection of at least one edge of the at least one hollowed portion on the base substrate; each inner detection electrode comprises a body portion and a plurality of protrusion portions protruding from the body portion and extending in directions away from the body portion; and the edge of each hollowed portion comprises a curved portion, an orthographic projection of the curved portion on the base substrate protrudes into a region between orthographic projections of at least two adjacent protrusion portions of the plurality of protrusion portions on the base substrate, a portion of the orthographic projection of the curved portion is closer to an orthographic projection of the body portion on the base substrate than top ends of the orthographic projections of the adjacent protrusion portions, and the top ends of the orthographic projections of the adjacent protrusion portions are end portions, away from the orthographic projection of the body portion, of the orthographic projections of the adjacent protrusion portions. In the embodiments of the present disclosure, the mutual capacitance formed between the outer detection electrode and the inner detection electrode is stronger, so the detection sensitivity of the detection substrate is higher.

For example, a position of a touch point that touching the detection substrate or a fingerprint of a finger located at the touch point may be determined according to a change of the mutual capacitance between the outer detection electrode and the inner detection electrode. That is, the embodiments of the present disclosure can be used to implement touch positioning or fingerprint recognition. The uses of the detection substrate in the embodiments of the present disclosure include, but are not limited to, touch positioning and fingerprint recognition.

As shown in FIG. 1A to FIG. 1C, a detection substrate provided by at least one embodiment of the present disclosure includes a base substrate 1, an outer detection electrode 2, and an inner detection electrode 3, and the outer detection electrode 2 and the inner detection electrode 3 located on the base substrate 1. The outer detection electrode 2 has a hollowed portion 21, the hollowed portion 21 corresponds to the inner detection electrode 3, that is, an orthographic projection of the inner detection electrode 3 on the base substrate 1 is provided in a region surrounded by an orthographic projection of an edge 2A of the hollowed portion 21 on the base substrate 1, that is, the orthographic projection of the inner detection electrode 3 on the base substrate 1 overlaps with (for example, completely overlaps or partially overlaps) the region surrounded by the orthographic projection of the edge 2A of the hollowed portion 21 on the base substrate 1, and the outer detection electrode 2 and the inner detection electrode 3 are insulated from each other. For example, as shown in FIG. 1A, the outer detection electrode 2 and the inner detection electrode 3 are separated by a gap, and the gap is filled with an insulating material, so that the outer detection electrode 2 is electrically insulated from the inner detection electrode 3. For example, the detection substrate provided by at least one embodiment of the present disclosure includes the base substrate 1, at least one outer detection electrode 2, and at least one inner detection electrode 3, the at least one outer detection electrode and the at least one inner detection electrode are on the base substrate, and the at least one outer detection electrode is insulated from the at least one inner detection electrode, the at least one outer detection electrode has at least one hollowed portion, the at least one hollowed portion corresponds to the at least one inner detection electrode, and at least one orthographic projection of the at least one inner detection electrode on the base substrate respectively overlaps with at least one region respectively surrounded by at least one orthographic projection of at least one edge of the at least one hollowed portion on the base substrate; each inner detection electrode comprises a body portion and a plurality of protrusion portions protruding from the body portion and extend in directions away from the body portion.

For example, as shown in FIG. 1A and FIG. 1B, the inner detection electrode 3 includes a body portion 30 and a plurality of protrusion portions 32, that is, the orthographic projection of the inner detection electrode 3 on the base substrate 1 includes an orthographic projection of the body portion 30 on the base substrate 1 (as shown in a dotted region) and orthographic projections of the plurality of protrusion portions 32 on the base substrate, the plurality of protrusion portions 32 protrude from the body portion 30 and extending in a direction away from the body portion 30, and the plurality of protrusion portions 32 are directly connected to the body portion 30, that is, each inner detection electrode 3 has an integrated structure.

As shown in FIG. 1A to FIG. 1C, the outer detection electrode 2 includes an outer edge 2B and an inner edge 2A. The inner edge 2A is closer to the inner detection electrode 3 than the outer edge 2B. The inner edge 2A is an edge of the hollowed portion 21, that is, a region enclosed by the inner edge 2A is the hollowed portion 21. The edge 2A of the hollowed portion 21 on the base substrate 1 includes a plurality of curved portions 22, that is, the orthographic projection of the edge 2A of the hollowed portion 21 on the base substrate 1 includes orthographic projections of the plurality of curved portions 22 on the base substrate 1, an orthographic projection of each curved portion 22 on the base substrate 1 protrudes into a region 31 between orthographic projections of two adjacent protrusion portions 32 on the base substrate 1, a portion of the orthographic projection of the curved portion 22 on the base substrate 1 (that is, a portion of the curved portion 22 that protrudes into the region 31) is closer to the orthographic projection of the body portion 30 on the base substrate 1 than top ends (refer to a top end 3201 of the protrusion portion 32A and a top end 3202 of the protrusion portion 32B) of the orthographic projections of the adjacent protrusion portion 32, and the top ends of the orthographic projections of the adjacent protrusion portion 32 are end portions, away from the orthographic projection of the body portion 30, of the orthographic projections of the adjacent protrusion portion 32.

For example, as shown in FIG. 1A, a shape of the orthographic projection of the edge 2A of the hollowed portion is approximately consistent with an outline shape of the inner detection electrode 3, and the edge 2A of the hollowed portion is substantially parallel to the outline of the inner detection electrode 3, which is beneficial to cause the curved portion 22 protrude into the region 31 between two adjacent protrusion portions 32 of the inner detection electrode 3 to simplify the structure. For example, in the case where the edge 2A of the hollowed portion is consistent with the outline shape of the inner detection electrode 3 and is approximately parallel to the outline of the inner detection electrode 3, a center of the orthographic projection of the edge 2A of the hollowed portion and a center of the orthographic projection of the inner detection electrode 3 approximately coincide.

For example, the outer detection electrode 2 and the inner detection electrode 3 are applied with different electrical signals during operation. For example, by taking the detection substrate for implementing a touch positioning function as an example, one of the outer detection electrode 2 and the inner detection electrode 3 is a touch driving electrode and the other is a touch sensing electrode. In this way, in the case where the outer detection electrode 2 and the inner detection electrode 3 are in an operating state, a mutual capacitance is formed between the outer detection electrode 2 and the inner detection electrode 3.

In the embodiment of the present disclosure, the orthographic projection of the curved portion 22 of the inner edge 2A of the outer detection electrode 2 protrudes into the region 31 between the orthographic projections of the adjacent protrusion portions 32 included in the inner detection electrode 3, therefore, compared with that the orthographic projection, such as a square does not include an electrode shape of the region where the curved portion 22 is allowed to protruded, on the one hand, in the case where the area is the same, a circumference of the inner detection electrode 3 in the embodiment of the present disclosure is larger; and on the other hand, a size of the outer detection electrode 2 in the embodiment of the present disclosure can further be set larger, so the inner detection electrode 3 and the outer detection electrode 2 have a large effective mutual capacitance value, which can improve the detection sensitivity of the detection substrate.

For example, as shown in FIG. 1A and FIG. 1B, the shape of the orthographic projection of the inner detection electrode 3 on the base substrate 1 is a cross, and the inner detection electrode 3 has four protrusion portions 32. In this case, the curved portion 22 may be provided in a region 31 between any adjacent protrusion portions 32.

Figure 2A:
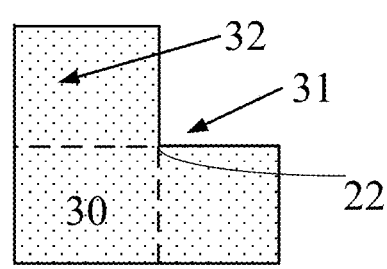
FIG. 2A is a schematic diagram of an orthographic projection, with an L shape, of an inner detection electrode in a detection substrate provided in at least one embodiment of the present disclosure.

In at least another embodiment, the shape of the orthographic projection of the inner detection electrode 3 is L-shaped. As shown in FIG. 2A, an orthographic projection of the L-shaped inner detection electrode 3 includes two protrusion portions protruding from the body portion 30. In this case, the curved portion 22 protruded into the region 31 between the two protrusion portions 32.

Figure 2B:
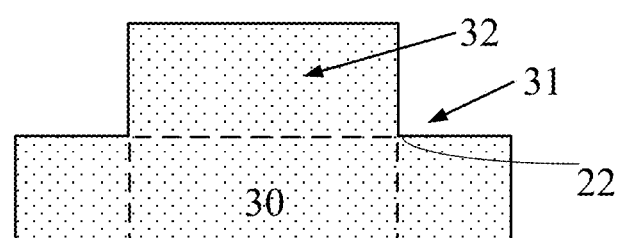
FIG. 2B is a schematic diagram of an orthographic projection, with an T shape, of an inner detection electrode in a detection substrate provided in at least one embodiment of the present disclosure.

In at least another embodiment, the shape of the orthographic projection of the inner detection electrode 3 is T-shaped, as shown in FIG. 2B, an orthographic projection of the T-shaped inner detection electrode 3 includes three protrusion portions protruding from the body portion 30. In this case, the curved portion 22 may only protrude into the region 31 between a part of protrusion portions 32 (refer to a region between a left protrusion portion and an upper protrusion portion and a region between a right protrusion portion and the upper protrusion portion in FIG. 2B).

Figure 2C:
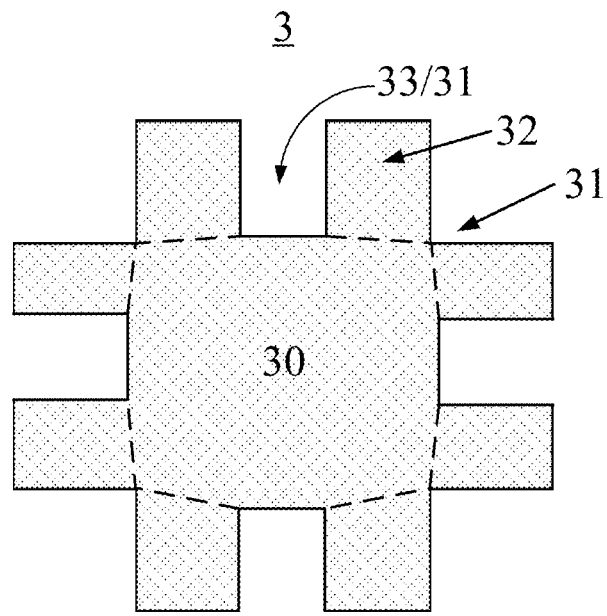
FIG. 2C is a schematic diagram of an orthographic projection, with 4+n protrusion portions (for example, n=4), of an inner detection electrode in a detection substrate provided by at least one embodiment of the present disclosure.

For the cross-shaped inner detection electrode 3 as shown in FIG. 1B, if a groove 33 as shown in FIG. 2C is provided in one protrusion portion 32, the inner detection electrode 3 adds one protrusion portion 32; If the groove 33 as shown in FIG. 2C is provided in two protrusion portion 32, the inner detection electrode 3 adds two protrusion portions 32; and so on. In view of this, in at least another embodiment, the orthographic projection of the inner detection electrode 3 has 4+n protrusion portions 32, and n≥1; and correspondingly, the outer detection electrode 2 has 4+n curved portions 22 (not shown in FIG. 2C); and a curved portion 22 of the outer detection electrode 2 is provided in the region between any adjacent protrusion portions 32.

It should be noted that, first, the region 31 between the adjacent protrusion portions 32 refers to a region between adjacent edges of the adjacent protrusion portions 32, respectively. The region between adjacent protrusion portions 32 may be a non-closed opening surrounded only by the adjacent protrusion portions 32, as shown by a reference numeral 31 in FIG. 1B, FIG. 2A to FIG. 2C; or, the region between the adjacent protrusion portions 32 may be a non-closed opening surrounded by the adjacent protrusion portions 32 and the body portion 30, as shown by a reference numeral 33 in FIG. 2C.

Second, regions between the orthographic projections of all adjacent protrusion portions of the plurality of protrusion portions 32 included in the inner detection electrode 3 are all provided with the orthographic projection of the curved portion 22; or, regions between the orthographic projections of only a part of adjacent protrusion portions of the plurality of protrusion portions 32 are provided with the orthographic projections of the curved portion 22.

Third, the inner detection electrode 3 and the outer detection electrode 2 are, for example, located on a same layer (that is, formed by a same conductive film, in this case, the materials of the inner detection electrode 3 and the outer detection electrode 2 are the same), which can simplify the manufacturing process. However, in other embodiments, the inner detection electrode 3 and the outer detection electrode 2 may be located on different layers (that is, formed by different conductive films).

Fourth, the inner detection electrode 3 and the outer detection electrode 2 can be located on the base substrate 1 side by side (that is, the inner detection electrode 3 and the outer detection electrode 2 are located on a same surface of the base substrate 1 side by side and directly contact the surface), which causes the inner detection electrode 3 and the outer detection electrode 2 to have a larger effective mutual capacitance value, and simplifies the structure of the detection substrate. In other embodiments, in a direction perpendicular to the base substrate 1, one of the inner detection electrode 3 and the outer detection electrode 2 may be located between the other of the inner detection electrode 3 and the outer detection electrode 2 and the base substrate 1.

Fifth, the above embodiments of the shape of the orthographic projection of the inner detection electrode 3 are used for illustration only. The shape of the orthographic projection of the inner detection electrode 3 in the embodiment of the present disclosure includes, but is not limited to, the concave polygons listed, and may also be other types of concave polygons or shapes similar to the concave polygons.

Sixth, "approximately" mentioned in the embodiments of the present disclosure means within an allowable range of errors.

In at least one embodiment of the present disclosure, for example, as shown in FIG. 1A, only one hollowed portion 21 is provided in the outer detection electrode 2. The hollowed portion 21 is a closed hollowed portion, that is, the shape of the edge 2A of the hollowed portion 21 is closed. In the case where only one closed hollowed portion 21 is provided in the outer detection electrode 2, for example, a shape of the outer edge 2B of the outer detection electrode 2 and the shape of the edge 2A of the hollowed portion may be approximately the same, the edge 2B of the outer detection electrode 2 is approximately parallel to the inner edge 2A, and a center of the edge 2A of the hollowed portion is approximately coincident with a center of the inner detection electrode 3, so the outer detection electrode 2 has a ring structure in which the inner edge 2A and the outer edge 2B are approximately parallel. For example, widths of the ring structure are equal everywhere. For example, in the case where the orthographic projection of the inner detection electrode is the shape as shown in FIG. 1B and FIG. 2A to FIG. 2C, the outer detection electrode of the ring shape is a cross-shaped ring, an L-shaped ring, a T-shaped ring, and a ring structure with 4+n protrusion portions correspondingly. With this arrangement, in the case where the detection substrate includes a plurality of outer detection electrodes 2 as shown in FIG. 1A, the outer detection electrodes 2 can be arranged relatively compactly. It should be noted that the shape of the orthographic projection of the outer detection electrode in the embodiments of the present disclosure include, but are not limited to, those shapes listed.

Figure 3A:
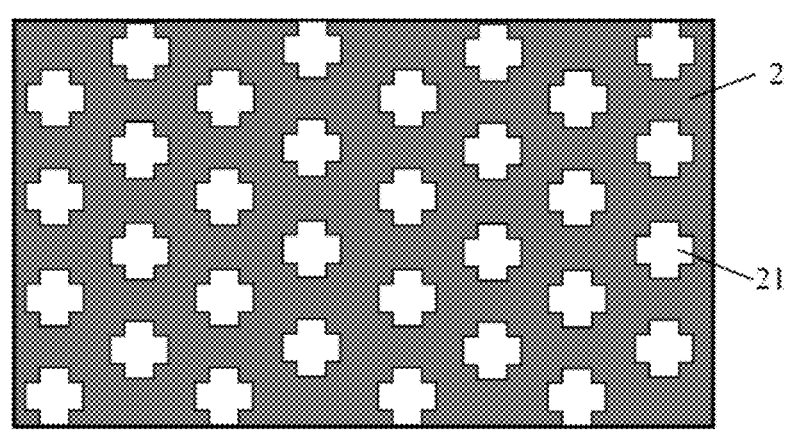
FIG. 3A is a schematic top view of an outer detection electrode, with a plurality of hollowed portions, in a detection substrate provided by at least one embodiment of the present disclosure.
Figure 3B:
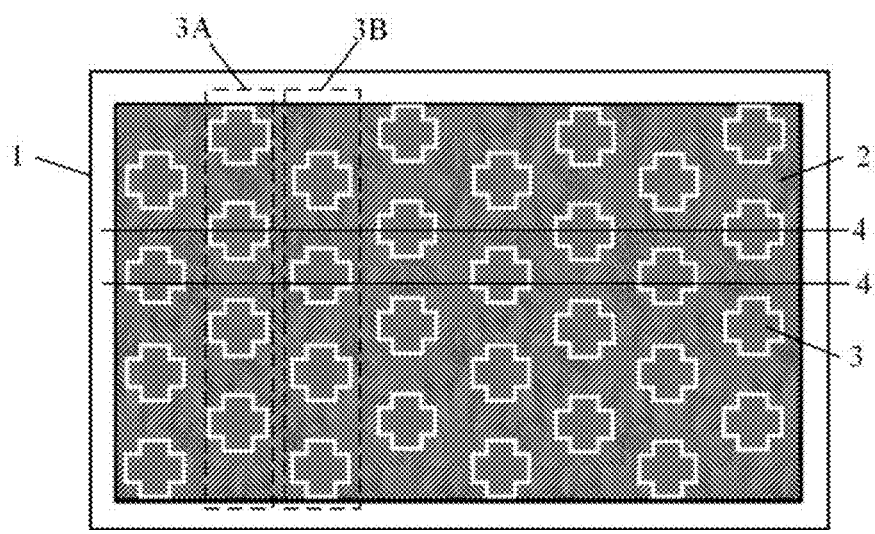
FIG. 3B is a schematic diagram of a position relationship between an outer detection electrode, an inner detection electrode, and a signal line in a detection substrate provided by at least one embodiment of the present disclosure.

For example, as shown in FIG. 3A and FIG. 3B, the outer detection electrode 2 is an integrated structure, that is, the outer detection electrodes 2 corresponding to respective inner detection electrode 3 are integrally formed, so the orthographic projection of the outer detection electrode 2 on the base substrate 1 is an integrated structure, and the outer detection electrode 2 has a plurality of hollowed portions 21 that are spaced apart. The at least one inner detection electrode includes a plurality of inner detection electrodes 3, and the plurality of hollowed portions 21 of the outer detection electrode 2 correspond to the plurality of inner detection electrodes 3, for example, each of the hollowed portions 21 corresponds to one inner detection electrode 3, and different hollowed portions 21 correspond to different inner detection electrodes 3. In the case where the outer detection electrode 2 and the plurality of inner detection electrodes 3 are in an operating state, for example, one of the outer detection electrode 2 and the plurality of inner detection electrodes 3 is a touch driving electrode and the other is a touch sensing electrode. It should be noted that, in the case where the plurality of hollowed portions 21 are provided in the outer detection electrode 2, the shape of the outer edge 2B of the outer detection electrode 2 is different from the shape of the orthographic projection of the edge of the hollowed portion 21.

For example, the plurality of hollowed portions 21 in the outer detection electrode 2 are all closed hollowed portions. In other embodiments, the hollowed portion located at an edge (for example, a left edge, a right edge, an upper edge, or a lower edge) in the outer detection electrode 2 (as show in FIG. 3A) may be made non-closed and the hollowed portion located inside the edge of the outer detection electrode 2 may be closed.

For example, as shown in FIG. 3B, the detection substrate provided by at least one embodiment of the present disclosure further includes a plurality of signal lines 4 arranged in a sequence (only two signal lines 4 are illustrated in FIG. 3B for illustration), and orthographic projections of the plurality of signal lines 4 on the base substrate 1 overlap with the orthographic projection of the outer detection electrode 2 on the base substrate 1. The inner detection electrodes 3 in the plurality of hollowed portions of the outer detection electrode 2 are arranged into a plurality of inner detection electrode queues (FIG. 3B shows eight inner detection electrode queues for illustration), each of the inner detection electrode queues includes at least two inner detection electrodes, and each of the inner detection electrode queues extends along an arrangement direction (refer to a vertical direction in FIG. 3B) of the plurality of signal lines 4. The plurality of inner detection electrode queues include a first inner detection electrode queue 3A and a second inner detection electrode queue 3B that are sequentially arranged along an extension direction (refer to a horizontal direction in FIG. 3B) of the plurality of signal lines, the extension direction of the plurality of signal lines 4 is different from the arrangement direction of the plurality of signal lines 4 (FIG. 3B illustrates the extension direction of the signal lines 4 perpendicular to the arrangement direction as an example), and inner detection electrodes 3 of the second inner detection electrode queue 3B and inner detection electrodes 3 of the first inner detection electrode queue 3A are staggered in the arrangement direction of the plurality of signal lines 4. For example, the inner detection electrodes in the second inner detection electrode queue 3B correspond to the inner detection electrodes in the first inner detection electrode queue 3A in a one-to-one correspondence, and lines between centers of the inner detection electrodes 3 that belong to different inner detection electrode queues and correspond to each other are not consistent with the extension direction of the signal line 4, that is, the arrangement direction of the inner detection electrodes 3 that belong to different inner detection electrode queues and correspond to each other is not consistent with the extending direction of the signal line 4, so the staggered setting can be achieved.

In the embodiments of the present disclosure, inner detection electrodes 3 of the second inner detection electrode queue 3B and the inner detection electrodes 3 of the first inner detection electrode queue 3A are staggered in the arrangement direction of the plurality of signal lines 4, so the orthographic projection of each of the plurality of signal lines 4 on the base substrate 1 overlaps with the orthographic projections of the outer detection electrode 2 and the inner detection electrode 3 on the base substrate 1, thereby avoiding or alleviating transverse mura caused by different parasitic capacitances between the outer detection electrode 2/the inner detection electrode 3 and the plurality of signal lines 4. Mura refers to a phenomenon that various traces are caused by uneven display brightness.

For example, on the basis that the orthographic projection of each of the plurality of signal lines 4 overlaps with the orthographic projections of the outer detection electrode 2 and the inner detection electrode 3, overlapping areas of regions where the orthographic projections of the plurality of signal lines 4 included in the detection substrate overlap with the orthographic projection of the outer detection electrode 2 are equal. Alternatively, the overlapping areas of regions where the orthographic projections of the plurality of signal lines 4 overlap with the orthographic projections of the inner detection electrodes 3 are equal. Alternatively, the overlapping areas of regions where the orthographic projections of the plurality of signal lines 4 overlap with the orthographic projection of the outer detection electrode 2 are equal, and the overlapping areas of regions where the orthographic projections of the plurality of signal lines 4 overlap with the orthographic projections of the inner detection electrodes 3 are equal. This further helps to avoid or alleviate mura. For example, the overlapping area of regions where the orthographic projections of respective signal line 4 overlap with the orthographic projection of the outer detection electrode 2 is approximately equal to the overlapping area of regions where the orthographic projections of the respective signal lines 4 overlap with the orthographic projection of the inner detection electrode 3, in this way, while avoiding or alleviating mura, it is further beneficial to increase the effective mutual capacitance value between the outer detection electrode and the inner detection electrode to improve detection sensitivity.

For example, the signal line 4 may be a gate line for providing a gate scanning signal or a data line for providing a data signal in the detection substrate, or the signal line 4 may be another type of signal line in the detection substrate.

Figure 4A:
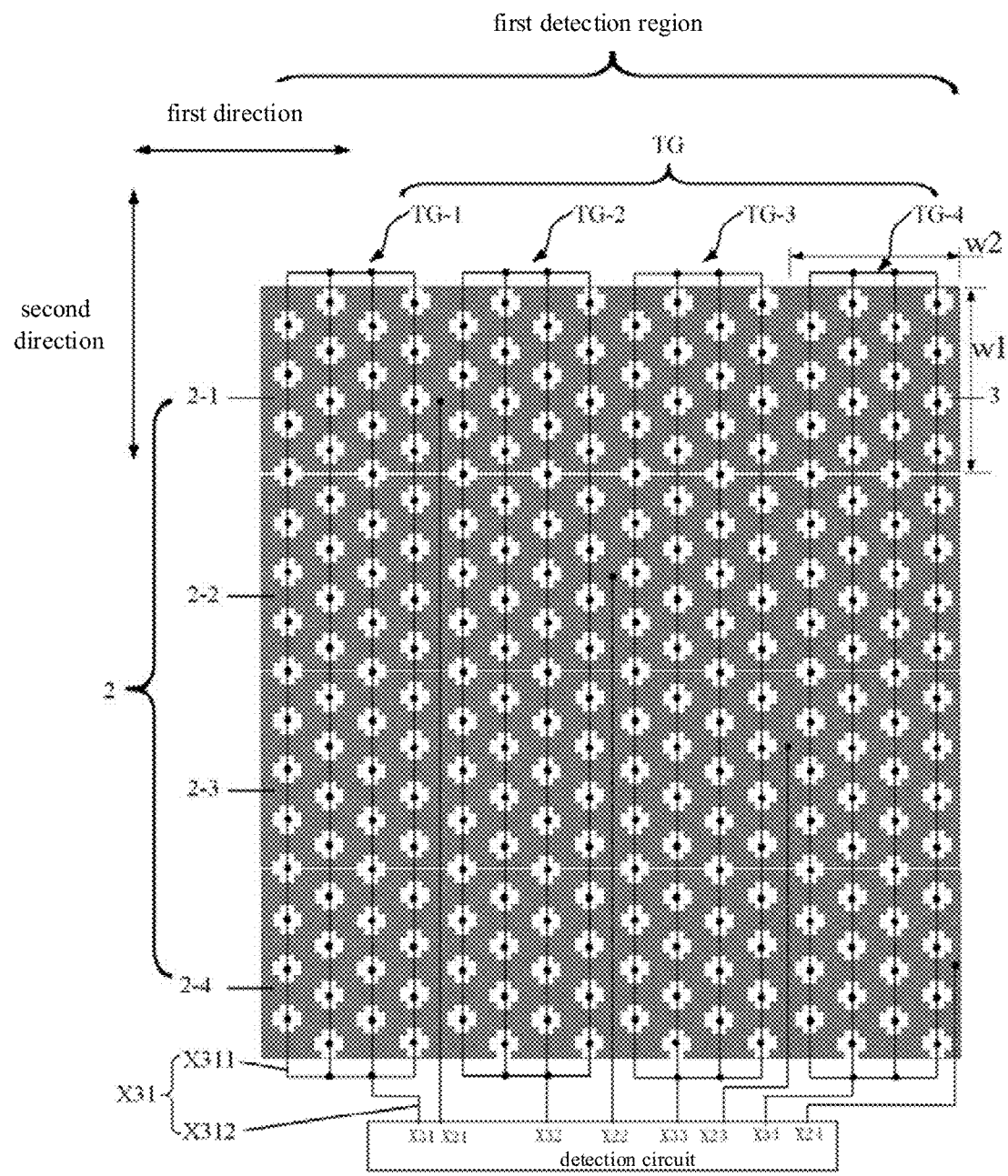
FIG. 4A is a schematic top view I of a plurality of outer detection electrodes and a plurality of inner detection electrode groups in a detection substrate provided by at least one embodiment of the present disclosure.
Figure 4B:
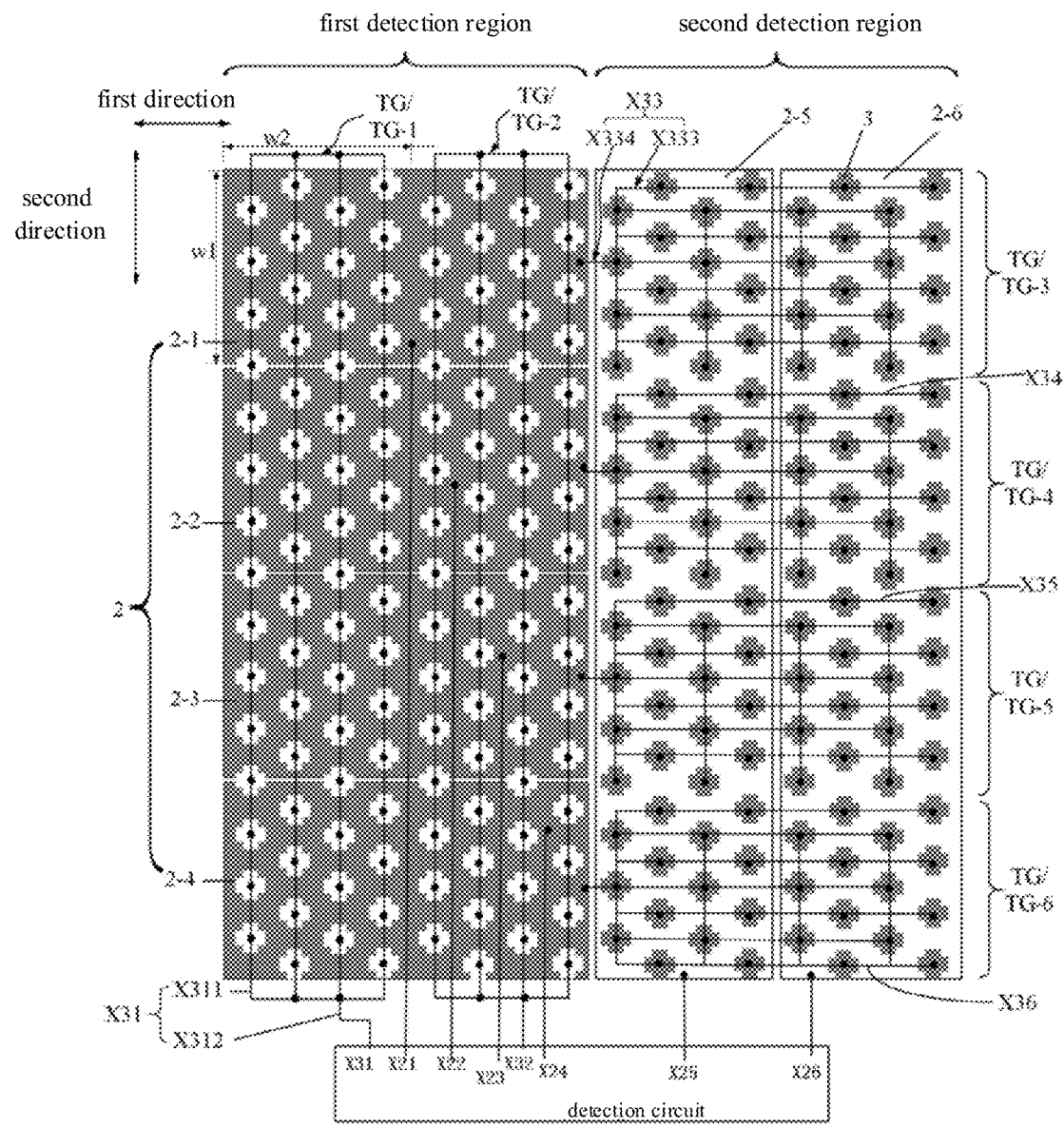
FIG. 4B is a schematic top view II of a plurality of outer detection electrodes and a plurality of inner detection electrode groups in a detection substrate provided by at least one embodiment of the present disclosure.

For example, as shown in FIG. 4A and FIG. 4B, the plurality of inner detection electrodes comprise provided by some embodiments of the present disclosure includes a plurality of inner detection electrode groups TG insulated from each other, in which four inner detection electrode groups TG-1 to TG-4 are shown in FIG. 4A, and six inner detection electrode groups TG-1 to TG-6 are shown in FIG. 4B. Each of the inner detection electrode groups TG includes a plurality of inner detection electrodes 3 spaced apart from each other, inner detection electrodes 3 in a same inner detection electrode group TG are electrically connected to each other, and inner detection electrodes 3 in different inner detection electrode groups TG are insulated from each other. The at least one outer detection electrode includes a plurality of outer detection electrodes 2 insulated from each other, four outer detection electrodes 2-1 to 2-4 are shown in FIG. 4A, and six outer detection electrodes 2-1 to 2-6 are shown in FIG. 4B. Each of the inner detection electrode groups TG corresponds to at least one outer detection electrode 2, and an extension direction of each inner detection electrode group TG intersects with an extension direction of outer detection electrode 2 corresponding to each inner detection electrode group TG Each of the inner detection electrode groups TG corresponding to at least one outer detection electrode 2 means that the plurality of inner detection electrodes 3 spaced apart from each other and included in each inner detection electrode group TG are respectively in one-to-one correspondence with the plurality of hollowed portions of the at least one outer detection electrode 2. It should be noted that, FIG. 4A and FIG. 4B are described by using each inner detection electrode group TG corresponding to multiple outer detection electrodes 2 as an example. In other embodiments, each of at least part of the inner detection electrode groups TG may corresponds to only one outer detection electrode.

In the embodiments of the present disclosure, the inner detection electrode group TG corresponds to the outer detection electrode 2, so an orthographic projection of a touch point on the base substrate overlaps with both the orthographic projection of the inner detection electrode group and the orthographic projection of the outer detection electrode, and the detection circuit included in the detection substrate can determine one of an abscissa and an ordinate of the touch point by the outer detection electrode 2, and can determine the other of the abscissa and the ordinate by the inner detection electrode group TG, thereby determining the position of the touch point.

For example, as shown in FIG. 4A and FIG. 4B, the detection substrate provided by the embodiment of the present disclosure further includes a plurality of outer detection leads (four outer detection leads X21-X24 are shown in FIG. 4A, and six outer detection leads X21-X26 are shown in FIG. 4B) and a plurality of inner detection leads (four inner detection leads X31-X34 are shown in FIG. 4A, and six inner detection leads X31-X36 are shown in FIG. 4B). The plurality of outer detection electrodes 2 included in the detection substrate are respectively electrically connected to the detection circuit through the plurality of outer detection leads, and the plurality of inner detection electrode groups TG included in the detection substrate are electrically connected to the detection circuit through the plurality of inner detection leads. It should be noted that, the black dots in FIG. 4A and FIG. 4B indicate electrical connections. For example, the outer detection electrode 2-1 is electrically connected to the outer detection lead X21, the outer detection electrode 2-2 is electrically connected to the outer detection lead X22, . . . , and so on; the inner detection electrode group TG1 is electrically connected to the inner detection lead X31, the inner detection electrode group TG2 is electrically connected to the inner detection lead X32, . . . , and so on.

As shown in FIG. 4A and FIG. 4B, the detection substrate includes a first detection region, the first detection region is provided with a first outer detection electrode (by taking 2-1 as an example), a first inner detection electrode group (by taking TG-1 as an example), and a first outer detection lead (by taking X21 as an example), and a first inner detection lead (by taking X31 as an example), and the first outer detection lead and the first inner detection lead are insulated from each other. The first outer detection electrode 2-1 is electrically connected to the detection circuit through the first outer detection lead X21. The first inner detection electrode group TG-1 is electrically connected to the detection circuit through the first inner detection lead X31. The first inner detection lead X31 includes a plurality of first sub-leads X311 electrically connecting the inner detection electrodes 3 included in the first inner detection electrode group TG-1, and the plurality of first sub-leads X311 are connected in parallel with each other to reduce a resistance of the first inner detection lead X31. The first inner detection lead X31 further includes a second sub-lead X312 electrically connected to the plurality of first sub-leads X311, and the plurality of first sub-leads X311 are electrically connected to the detection circuit through the second sub-lead X312. It should be noted that, the figure only uses the first inner detection lead to include four first sub-leads as an example for description. In other embodiments, the first inner detection lead may also be other numbers of the first sub-leads.

In the embodiments of the present disclosure, the first outer detection electrode 2-1 is electrically connected to the detection circuit through the first outer detection lead X21, the first inner detection electrode group TG-1 is electrically connected to the detection circuit through the first inner detection lead X31, and the plurality of first sub-leads X311 of the first inner detection lead X31 are electrically connected to the detection circuit through a second sub-lead X312. This wiring manner is beneficial for the first outer detection lead X21 and the first inner detection lead X31 not to pass through a bezel region on both sides of the detection substrate, but directly from the first detection region into a bezel region on where the detection circuit is located, thereby facilitating implementation of narrow bezel design on both sides. On the other hand, this wiring manner can enable the first outer detection lead X21 and the first inner detection lead X31 have only two signal output terminals in the bezel region where the detection circuit is located, which is beneficial to narrowing the bezel region on where the detection circuit is located.

For example, as shown in FIG. 4A and FIG. 4B, the second sub-lead X312 is electrically connected to end portions, close to the detection circuit, of the plurality of first sub-leads X311 to connect the plurality of first sub-leads X311 in parallel. For example, the second sub-lead X312 is located in a region between the end portions of the plurality of first sub-leads X311 and the detection circuit, so a length of the second sub-lead X312 is small, which is advantageous for achieving the narrow bezel design.

For example, as shown in FIG. 4A and FIG. 4B, an extension direction of the first outer detection lead X21 is consistent with an extension direction of the first sub-lead X311 of the first inner detection lead X31, which helps to simplify wiring.

For example, as shown in FIG. 4A and FIG. 4B, inner detection electrodes 3 electrically connected to adjacent first sub-leads X311 are staggered in the extension direction of the first sub-lead X311. That is, a part of inner detection electrodes 3 electrically connected to one of the adjacent first sub-leads X311 constitutes the above-mentioned first inner detection electrode queue, and a part of inner detection electrodes 3 electrically connected to the other of the adjacent first sub-leads X311 constitutes the above-mentioned second inner detection electrode queue. As mentioned above, by adopting this staggered arrangement, it is advantageous to avoid or alleviate the transverse mura.

For example, as shown in FIG. 4B, the plurality of outer detection electrodes 2 in the detection substrate further include a second outer detection electrode (by taking 2-5 as an example), and the plurality of inner detection electrode groups TG in the detection substrate further include a second inner detection electrode group (by taking TG-3 as an example) in a hollowed portion of the outer detection electrode 2-5. The detection substrate includes a second detection region in addition to the first detection region, and the second detection region is provided with the second outer detection electrode 2-5, the second inner detection electrode group TG-3, a second outer detection lead (by taking X25 as an example), and a second inner detection lead (by taking X33 as an example), the second outer detection lead and the second inner detection lead are insulated from each other. The second outer detection electrode 2-5 is electrically connected to the detection circuit through the second outer detection lead X25. For example, the second outer detection lead X25 is electrically connected to an end portion, close to the detection circuit, of the second outer detection electrode 2-5, so a length of the second outer detection lead X25 can be reduced. The second inner detection electrode group TG-3 is electrically connected to the detection circuit through the second inner detection lead X33. The second inner detection lead X33 includes a plurality of third sub-leads X333 which are electrically connected to the inner detection electrodes 3 included in the second inner detection electrode group TG-3, and the plurality of third sub-leads X333 are connected in parallel with each other to reduce a resistance of the third inner detection lead X33. For example, in order to simplify wiring, the plurality of third sub-leads X333 are electrically connected to the first outer detection electrode 2-1 to electrically connect the detection circuit. In this case, the second inner detection electrode group TG-3 is electrically connect to the detection circuit through the second inner detection lead X33, the first outer detection electrode 2-1 electrically connected to the second inner detection lead X33, and the first outer detection lead X21 electrically connected to the first outer detection electrode 2-1. It should be noted that the figure only uses the second inner detection lead to include seven third sub-leads as an example for description. In other embodiments, the third sub-leads may also be other numbers.

For example, as shown in FIG. 4B, the second inner detection lead X33 further includes a fourth sub-lead X334, and the plurality of third sub-leads X333 included in the second inner detection lead X33 are electrically connected to the first outer detection electrode 2-1 through the fourth sub-lead X334 to simplify wiring.

For example, as shown in FIG. 4B, the inner detection electrodes 3 electrically connected to adjacent third sub-leads X333 are staggered in an extension direction of the third sub-lead X333. In the case where the signal line 4 as shown in FIG. 3B extends along the extension direction of the third sub-lead X333, on the basis of that the inner detection electrodes 3 electrically connected to adjacent first sub-leads X311 are staggered in the extension direction of the first sub-lead X311, the manner of that the inner detection electrodes 3 electrically connected to adjacent third sub-leads X333 are staggered in the extension direction of the third sub-lead X333 is beneficial to further avoid or alleviate the transverse mura.

For example, in the embodiment as shown in FIG. 4A and FIG. 4B, in the first detection region, the plurality of first outer detection electrodes (refer to 2-1 to 2-4) all extend in a first direction and are sequentially arranged along a second direction (different from the first direction, for example, perpendicular to the first direction). The first outer detection leads (refer to X21 to X24) respectively electrically connected to the plurality of first outer detection electrodes extend in the second direction. The plurality of first inner detection electrode groups (refer to TG-1 to TG-4 as shown in FIG. 4A, and TG-1 and TG-2 as shown in FIG. 4B) are sequentially arranged along the first direction and extend along the second direction. The first inner detection leads (refer to X31 to X34 as shown in FIG. 4A, and X31 and X32 as shown in FIG. 4B) respectively electrically connected to the plurality of first inner detection electrode groups are all sequentially arranged along the first direction and extend along the second direction.

For example, in the embodiment as shown in FIG. 4B, in the second detection region, the plurality of second outer detection electrodes (refer to 2-5 and 2-6) are sequentially arranged along the first direction and all extend along the second direction. The plurality of second inner detection electrodes (refer to TG-3 to TG-6) all extend in the first direction and are sequentially arranged along the second direction. The second inner detection leads (refer to X33 to X36) respectively electrically connected to the plurality of second inner detection electrode groups all extend in the first direction and are sequentially arranged in the second direction.

It should be noted that the arrangement of the detection electrodes and the detection leads in the embodiments of the present disclosure includes, but is not limited to, the situations as shown in FIG. 4A and FIG. 4B. In other embodiments, in the case where the detection substrate includes the first detection region and the second detection region, the number of outer detection electrodes in the first detection region may be equal to or unequal to the number of outer detection electrodes in the second detection region, and the number of the outer detection electrodes in each detection region may be one or more.

Figure 5:
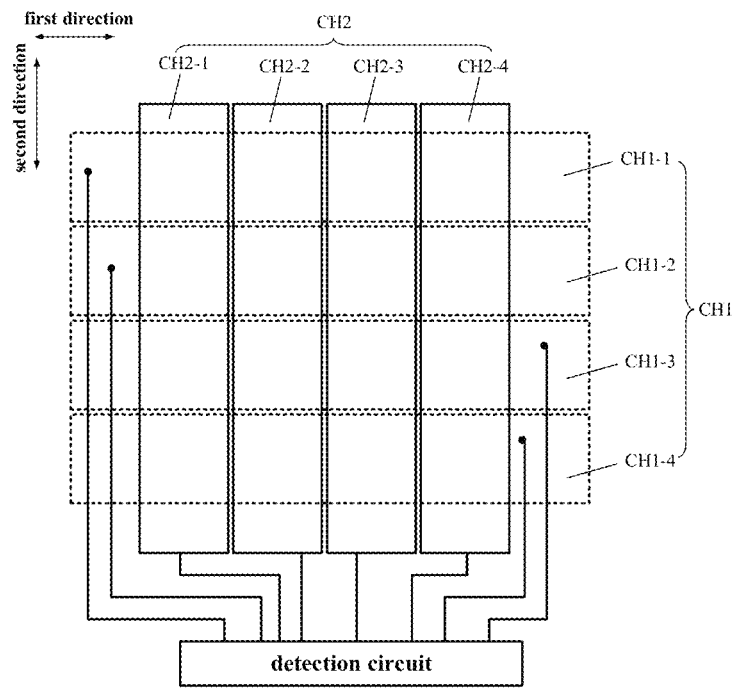
FIG. 5 is a schematic diagram of forming a plurality of signal channels by outer detection electrodes and inner detection electrodes in a detection substrate provided by at least one embodiment of the present disclosure.

For example, the working principle of the outer detection electrodes and the inner detection electrodes of the detection substrate in the embodiment of the present disclosure is as follows. As shown in FIG. 5, the plurality of outer detection electrodes and the plurality of inner detection electrode groups in the detection substrate form a plurality of first signal channels CH1 and a plurality of second signal channels CH2 crossing the plurality of first signal channels CH1 (FIG. 5 shows four first signal channels CH1-1 to CH1-4 and four second signal channels CH2-1 to CH2-4 as an example for illustration), each of the plurality of first signal channels CH1 extends along the first direction and is electrically connected to the detection circuit through a signal line, and each of the plurality of second signal channels CH2 extends along the second direction that is different from the first direction, and is electrically connected to the detection circuit through a signal line. For example, one of the first signal channel CH1 and the second signal channel CH2 is a signal channel formed for the touch driving electrode and the other is a signal channel formed for the touch sensing electrode, and the detection circuit can determine the position of the touch point according to an amount of change in a mutual capacitance between the plurality of first signal channels CH1 and the plurality of second signal channels CH2. Based on this, an area of the overlapping region (hereinafter referred to as the "detection zone", and four first signal channels and four second signal channels in FIG. 5 form 16 detection zones by crossing) of each first signal channel and each second signal channel can be set according to the requirements of fingerprint detection to achieve fingerprint detection.

In some embodiments, by applying detection signals of different frequencies to the outer detection electrodes and the inner detection electrodes, an integrated self-mutual capacitance technology can be implemented. In the integrated self-mutual capacitance technology, the outer detection electrode itself serves as a first self-capacitance electrode, the inner detection electrode itself serves as a second self-capacitance electrode, a mutual capacitance is formed between the outer detection electrode and the inner detection electrode corresponding to the hollowed portion of the outer detection electrode, and the detection circuit can obtain a change of a mutual capacitance signal and a change of a self-capacitance signal by processing signals output from the outer detection lead and the inner detection lead, so the detection, for example, detecting the position of the touch point or detecting the fingerprint, of the two types of capacitance can be performed more accurately.

For example, in the first detection region of the embodiment as shown in FIG. 4A, the four outer detection electrodes 2-1 to 2-4 all extend in the first direction to form four first signal channels, and the four inner detection electrode groups TG-1 to TG-4 all extend in the second direction to form four second signal channels. In this case, for example, in the embodiment as shown in FIG. 4A, the first outer detection electrode 2-1 is a touch driving electrode, and the inner detection electrodes 3 in the first inner detection electrode group TG-1 each is a touch sensing electrode; or, in the first detection region, the first outer detection electrode 2-1 is a touch sensing electrode, and the inner detection electrodes 3 in the first inner detection electrode group TG-1 each is a touch driving electrode.

For example, in the embodiment as shown in FIG. 4B, the four outer detection electrodes 2-1 to 2-4 in the first detection region and the four inner detection electrode groups TG-3 to TG-6 in the second detection region form four first signal channels, and the two inner detection electrode groups TG-1, TG-2 in the first detection region and the two outer detection electrodes 2-5 and 2-6 in the second detection region form four second signal channels. In this case, for example, the first outer detection electrode 2-1 and the inner detection electrodes 3 in the second inner detection electrode group TG-3 are all touch driving electrodes, and the second outer detection electrode 2-5 and the inner detection electrodes 3 in the first inner detection electrode group TG-1 are all touch sensing electrodes; or, the first outer detection electrode 2-1 and the inner detection electrodes 3 in the second inner detection electrode group TG-3 are all touch sensing electrodes, and the second outer detection electrode 2-5 and the inner detection electrodes 3 in the first inner detection electrode group TG-1 are all touch driving electrodes.

In the embodiment as shown in FIG. 4B, the outer detection electrode 2-1 in the first detection region is electrically connected to the inner detection electrode group TG-3 in the second detection region, so the outer detection electrode 2-1 and the inner detection electrode group TG-3, sequentially arranged in the first direction, form the first signal channel extending in the first direction; the outer detection electrode 2-2 in the first detection region is electrically connected to the inner detection electrode group TG-4 in the second detection region, so the outer detection electrode 2-2 and the inner detection electrode group TG-4, sequentially arranged in the first direction, form another first signal channel extending in the first direction; . . . ; and so on. In addition, the two inner detection electrode groups TG-1 and TG-2 in the first detection region both extend in the second direction to form two second signal channels, and the two outer detection electrodes 2-5, 2-6 in the second detection region both extend in the second direction to form two other second signal channels.

For example, materials of the outer detection electrode 2 and the inner detection electrode 3 are transparent conductive materials, such as indium tin oxide (ITO), indium zinc oxide (IZO), or the like. For example, materials of the outer detection lead and the inner detection lead are metal materials to reduce the resistance of the lead, in this case, for example, the outer detection lead and the inner detection lead are electrically connected to the corresponding outer detection electrode and inner detection electrode through vias (as shown by black dots in FIG. 4A and FIG. 4B).

It should be noted that both FIG. 4A and FIG. 4B are described by taking the detection substrate including four first signal channels and four second signal channels as an example. The number of the first signal channels and the second signal channels includes, but is not limited to, the situation shown in the embodiment as shown in FIG. 4A and FIG. 4B.

By taking the detection of the position of the touch point of a finger as an example, because a touch area of the finger is about 5 mm*5 mm, in order to ensure the detection accuracy, for example, an area of the detection zone is about 5 mm*5 mm. In view of this, for example, a width w1 of each of the outer detection electrodes 2 in FIG. 4A and FIG. 4B ranges from 4 mm to 6 mm, for example, 4.5 mm to 5.5 mm; and in addition, a width w2 of the inner detection electrode group TG in FIG. 4A and FIG. 4B ranges from 4 mm to 6 mm, for example, 4.5 mm to 5.5 mm.

Figure 6:
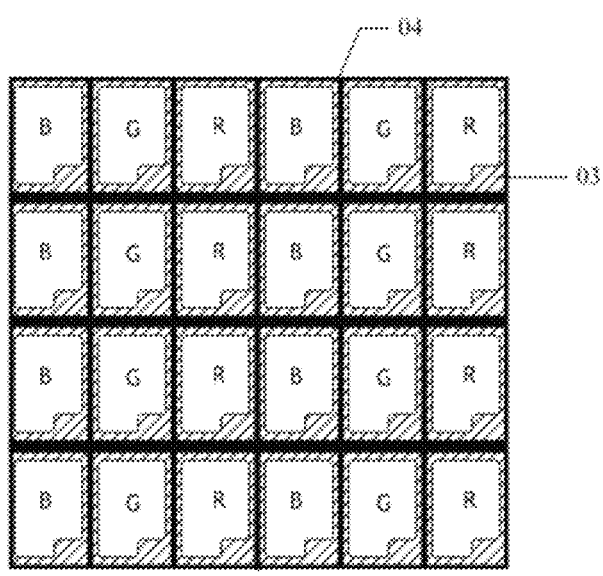
FIG. 6 is a schematic top view of a black matrix and a plurality of sub-pixels in a detection substrate provided by at least one embodiment of the present disclosure.

For example, as shown in FIG. 6, the detection substrate provided by at least one embodiment of the present disclosure includes a black matrix 04 and a plurality of sub-pixels 03 for imaging. The black matrix 04 is opaque and has a grid-like structure, and the plurality of sub-pixels 03 are in openings of the grid-like structure. For example, the plurality of sub-pixels 03 include red sub-pixels R, green sub-pixels G, and blue sub-pixels B.

In order to avoid affecting the display, for example, the orthographic projections of the outer and inner edges of the outer detection electrode 2 on the base substrate, and the orthographic projection of the edge of the inner detection electrode 3 on the base substrate are located in a region on where the black matrix 04 is located.

Figure 7:
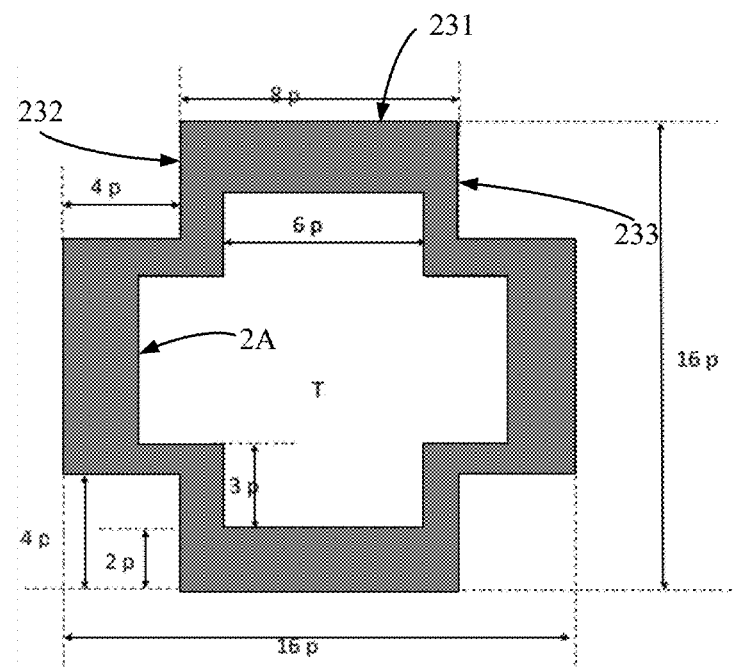
FIG. 7 is a schematic diagram of dimensions of the outer detection electrode as shown in FIG. 1C.

By taking the first detection region in the embodiment as shown in FIG. 4A and FIG. 4B as an example, each detection zone in the first detection region includes four inner detection electrode queues and the outer detection electrodes 2 surrounding the four inner detection electrode queues, and each inner detection electrode queue includes four inner detection electrodes sequentially arranged along the second direction, that is, each detection zone includes 4*4 outer detection electrodes 2 and inner detection electrodes 3 as shown in FIG. 1A. In the case where the area of the detection zone is about 5 mm*5 mm and the edges of the outer detection electrode 2 and the inner detection electrode 3 are located in the region om where the black matrix 04 is located, for example, a size of the cross-shaped outer detection electrode 2 may adopt the embodiment as shown in FIG. 7. For example, as shown in FIG. 7, an outer edge (not shown in FIG. 7) of the orthographic projection of the outer detection electrode and the inner edge 2A are approximately parallel, and both are cross-shaped, and a center of a region surrounded by the outer edge and a center of a region surrounded by the inner edge are approximately coincident. The shape of the outer edge 2B includes four outer edge protrusion portions, each outer edge protrusion portion includes two side edges 232, 233 and an end edge 231 located between the two side edges, the two side edges 232, 233 are approximately equal in length, the length of the end edge 231 is approximately twice the length of each side edge, and adjacent side edges respectively belonging to adjacent outer edge protrusion portions are approximately vertical. For example, in the case where the detection substrate includes a plurality of sub-pixels for imaging, a length of a single sub-pixel is represented by p (the sub-pixel has a length and a width, and the length is greater than the width), a distance between the end edges of the opposing outer edge protrusion portions is approximately 16 p, the length of the side edges 232, 233 is approximately 4 p, the length of the end edge 231 is approximately 8 p, the length of a side of the inner edge 2A that is approximately parallel to the end edge 231 is approximately 6 p, the length of a side of the inner edge 2A that is approximately parallel to the side edges 232/233 is approximately 3 p, and the distance between the inner edge and the outer edge at a position corresponding to the end edge 231 is approximately 2 p. The length of the end edge 231 is approximately twice the length of each side edge, which is beneficial to achieve that the overlapping area of each signal line and the outer detection electrode is approximately equal to the overlapping area of each signal line and the inner detection electrode, and further increase the effective mutual capacitance value to further improve the detection sensitivity. It should be noted that the dimensions in the embodiment as shown in FIG. 7 are only for illustration, and the embodiments of the present disclosure include but are not limited to the situation as shown in FIG. 7.

Figure 8:
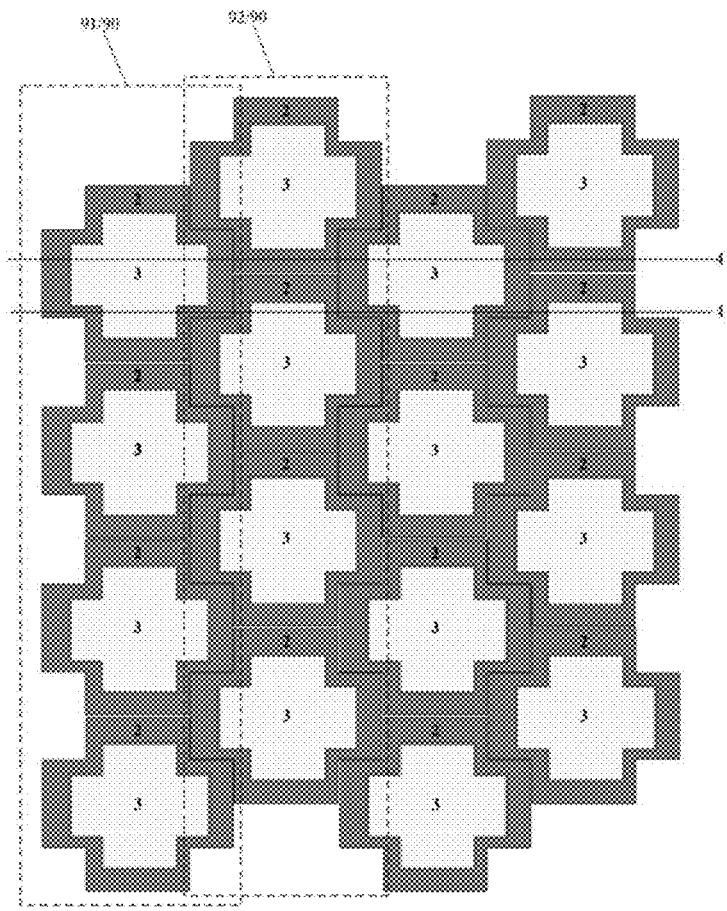
FIG. 8 is a schematic top view of a detection substrate provided by at least one embodiment of the present disclosure.

An embodiment of the present disclosure further provides a detection substrate, as shown in FIG. 8, the detection substrate includes a base substrate 1, a plurality of detection units on the base substrate, and a plurality of signal lines 4 arranged in a sequence on the base substrate 1. Each detection unit is shown in FIG. 1A, that is, each detection unit includes an inner detection electrode 3 as shown in FIG. 1B and an outer detection electrode 2 as shown in FIG. 1C. The outer detection electrode 2 has a hollowed portion, the hollowed portion corresponds to the inner detection electrode 3, that is, and an orthographic projection of the inner detection electrode 3 on the base substrate 1 is provided in a region surrounded by an orthographic projection of an edge of the hollowed portion on the base substrate 1, that is, the orthographic projection of the inner detection electrode 3 on the base substrate 1 overlaps with the region surrounded by the orthographic projection of the edge of the hollowed portion on the base substrate 1. Orthographic projections of the plurality of signal lines 4 on the base substrate 1 overlap with orthographic projections of the plurality of detection units on the base substrate 1. The plurality of detection units are divided into a plurality of detection unit queues 90 (FIG. 8 uses four detection unit queues as an example for illustration), the plurality of detection unit queues include a first detection unit queue 91 and a second detection unit queue 92 that are sequentially arranged along an extension direction (refer to the horizontal direction in FIG. 8) of the plurality of signal lines 4, the first detection unit queue 91 and the second detection unit queue 92 both include at least two detection units and both extend along an arrangement direction (refer to the vertical direction in FIG. 8) of the plurality of signal lines 4, and the arrangement direction of the plurality of signal lines 4 is different from the extension direction of the plurality of signal lines 4. Inner detection electrodes 3 of the second detection unit queue 92 and inner detection electrodes 3 of the first detection unit queue 91 are staggered in the arrangement direction of the plurality of signal lines 4.

In the embodiments of the present disclosure, the inner detection electrodes 3 of the first detection unit queue 91 and the inner detection electrodes 3 of the second detection unit queue 92 are staggered in the arrangement direction of the signal lines 4, that is, the arrangement direction of adjacent inner detection electrodes 3 belonging to different detection unit queues is not consistent with the extension direction of the signal lines, which is beneficial to avoid a part of the signal lines 4 overlapping with the outer detection electrode 2 but not the inner detection electrode 3, that is, it is beneficial to realize that each signal line 4 overlaps with both the outer detection electrode 2 and the inner detection electrode 3, thereby helping to reduce the transverse mura.

For example, on the basis that the orthographic projection of each signal line 4 overlaps with the orthographic projection of the outer detection electrode 2 and the orthographic projection of part of the inner detection electrodes 3, areas of overlapping regions of the orthographic projections of the plurality of signal lines 4 included in the detection substrate and the orthographic projection of the outer detection electrode 2 are equal. Alternatively, the areas of the overlapping regions of the orthographic projections of the plurality of signal lines 4 and the orthographic projections of the inner detection electrodes 3 are equal. Alternatively, the areas of the overlapping regions of the orthographic projections of the plurality of signal lines 4 and the orthographic projection of the outer detection electrode 2 are equal, and the areas of the overlapping regions of the orthographic projections of the plurality of signal lines 4 and the orthographic projections of the inner detection electrodes 3 are equal. This manner further helps to avoid or alleviate the transverse mura. For example, the area of the overlapping region of the orthographic projection of each signal line 4 and the orthographic projection of the outer detection electrode 2 is approximately equal to the area of the overlapping region of the orthographic projection of the signal line 4 and the orthographic projection of the inner detection electrode 3, in this way, while avoiding or alleviating the transverse mura, it is further beneficial to increase the effective mutual capacitance value between the outer detection electrode and the inner detection electrode to improve detection sensitivity.

For example, the signal line 4 may be a gate line for providing a gate scanning signal or a data line for providing a data signal in the detection substrate, or the signal line 4 may be another type of signal line in the detection substrate.

For example, the position of the touch point that touching the detection substrate or the fingerprint of a finger located at the touch point may be determined according to the change of the mutual capacitance between the outer detection electrode and the inner detection electrode. That is, the embodiments of the present disclosure can be used to implement touch positioning or fingerprint recognition. The uses of the detection substrate in the embodiments of the present disclosure include, but are not limited to, touch positioning and fingerprint recognition.

For example, the inner detection electrodes in a same detection unit queue 90 are electrically connected to each other through a lead that extends in the same direction as the detection unit queue to reduce the number of signal transmission lines for signal transmission of the inner detection electrodes. It should be noted that, the lead is, for example, the first sub-lead X311 in FIG. 4A or the third sub-lead X333 in FIG. 4B. Therefore, for the manner of setting the lead, reference may be made to the related descriptions above, and details are not described again.

It should be noted that, the inner detection electrodes in the first detection unit queue 91 and the inner detection electrodes in the second detection unit queue 92 may be electrically connected to each other or may be insulated from each other. For example, in the case where the inner detection electrodes in the first detection unit queue 91 and the inner detection electrodes in the second detection unit queue 92 are electrically connected to each other, a lead for electrically connecting the inner detection electrodes in the first detection unit queue 91 and a lead for electrically connecting the inner detection electrodes in the second detection unit queue 92 may be connected in parallel with each other to reduce the resistance of the lead. For example, the first detection unit queue 91 and the second detection unit queue 92 may be adjacent, as shown in FIG. 8; or, the first detection unit queue 91 and the second detection unit queue 92 may not be adjacent.

In some embodiments of the present disclosure, outer detection electrodes 2 of at least partially adjacent detection units may be applied with different electrical signals. In this case, the outer detection electrodes of the adjacent detection units are insulated from each other, as shown in FIG. 8. In this case, for example, in order to facilitate a compact arrangement between the outer detection electrodes of adjacent detection units, the outline shape of the outer edge of the outer detection electrode is a cross shape (as shown in FIG. 8), or the outline shape of the outer edge of the outer detection electrode is consistent with the shape of the edge of the inner detection electrode shown in any one of FIG. 2A to FIG. 2C.

In some embodiments of the present disclosure, the outer detection electrodes of at least partially adjacent detection units may be applied with a same electrical signal. In this case, for example, the outer detection electrodes of adjacent detection units are directly connected to reduce the number of signal transmission lines for signal transmission of the outer detection electrodes. For example, the first detection unit queue 91 and the second detection unit queue 92 are adjacent detection unit queues, and the outer detection electrodes in the first detection unit queue 91 and the outer detection electrodes in the second detection unit queue 92 are directly connected. For example, the outer detection electrode having a plurality of hollowed portions and having an integrated structure as shown in FIGS. 3A and 3B can be formed by directly connecting the outer detection electrodes of a plurality of detection unit queues.

For example, in the case where the detection substrate includes a plurality of sub-pixels for imaging, p is used to represent the length of a single sub-pixel, and the size of the outer detection electrode may adopt the embodiment as shown in FIG. 7. For example, as shown in FIG. 7, the outer edge of the outer detection electrode includes a plurality of outer edge protrusion portions. The distance between the end edges 231 of the opposing outer edge protrusion portions is approximately 16 p, the length of the side edges 232, 233 is approximately 4 p, the length of the end edge 231 is approximately 8 p, the length of a side of the inner edge 2A, that is approximately parallel to the end edge 231, of the outer direction electrode is approximately 6 p, the length of a side of the inner edge 2A that is approximately parallel to the side edges 232/233 is approximately 3 p. In this case, the circumference of the cross-shaped inner detection electrode 3 is approximately 12 p*4=48 p. Compared with a square electrode of the same area, the circumference of the cross-shaped inner detection electrode 3 is larger.

On the other hand, in the case where the outer detection electrode 2 in the embodiment as shown in FIG. 8 adopts the above-mentioned size design, in an extending direction of a signal line 4 (taking an upper signal line 4 as an example), the total length of the sub-pixels occupied by the outer detection electrodes 2 overlapping with the signal line 4 is (2 p+2 p+8 p)*2=24 p, and the total length of the sub-pixels occupied by the inner detection electrodes 3 overlapping with the signal line 4 is 12 p+12 p=24 p. It can be seen that, enabling the length of the end edge 231 of the outer detection electrode 2 approximately equal to twice the length of the side edge 232/233 can cause that the overlapping area of each signal line and the outer detection electrode is approximately equal to the overlapping area of each signal line and the inner detection electrode, and further increase the effective mutual capacitance value to further improve the detection sensitivity.

It should be noted that, the dimensions in the embodiment as shown in FIG. 7 are only for illustration, and the embodiments of the present disclosure include but are not limited to the situation as shown in FIG. 7.

For the arrangement manner of the outer detection electrode, the inner detection electrode, and the signal line in the embodiment as shown in FIG. 8, reference may be made to the arrangement manner of the same structure in the embodiment as shown in FIG. 1A to FIG. 7, and details are not described again.

In some embodiments, by applying detection signals of different frequencies to the outer detection electrodes and the inner detection electrodes, the integrated self-mutual capacitance technology can be implemented. In the integrated self-mutual capacitance technology, the outer detection electrode itself serves as a first self-capacitance electrode, the inner detection electrode itself serves as a second self-capacitance electrode, a mutual capacitance is formed between the outer detection electrode and the inner detection electrode corresponding to the hollowed portion of the outer detection electrode, and the detection circuit included in the detection substrate can obtain a change of a mutual capacitance signal and a change of a self-capacitance signal by processing signals output from the outer detection lead and the inner detection lead, so the detection, for example, detecting the position of the touch point or detecting the fingerprint, of the two types of capacitance can be performed more accurately.

At least one embodiment of the present disclosure further provides a display device including the detection substrate provided by any one of the above embodiments.

For example, the display device may be a display panel, a liquid crystal panel, an electronic paper, an OLED panel, a mobile phone, a tablet computer, a television, a display, a notebook computer, a digital photo frame, a navigator and other products or members having display function.

Figure 9:
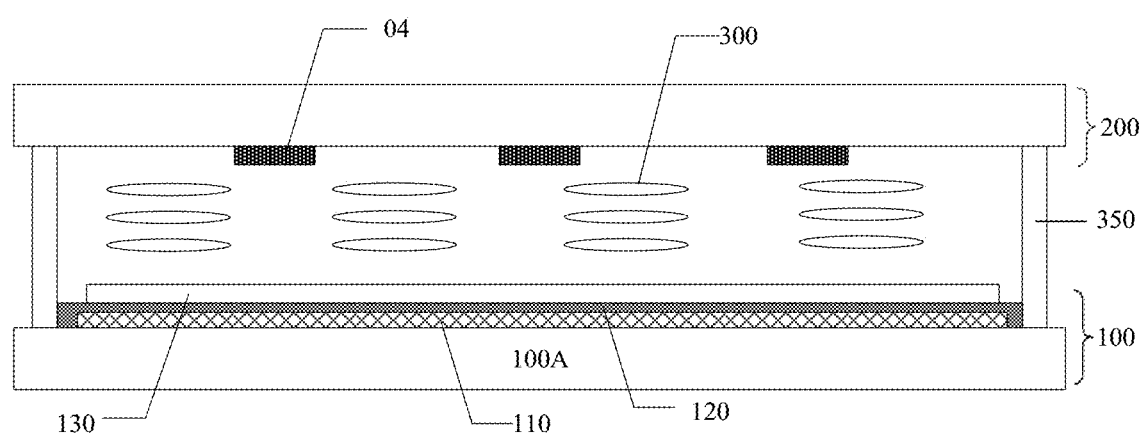
FIG. 9 is a schematic diagram of a display device provided by at least one embodiment of the present disclosure.

For example, as shown in FIG. 9, the display device includes a display panel including an array substrate 100, an opposite substrate 200, and a liquid crystal layer 300. The opposite substrate 200 is disposed opposite to the array substrate 100 and connected by a sealant 350. The liquid crystal layer 300 is located between the opposite substrate 200 and the array substrate 100. The array substrate 100 includes a base substrate 100A and a pixel electrode layer 110, a common electrode layer 130 thereon, and an insulating layer 120 that separates the pixel electrode layer 110 and the common electrode layer 130. An electric field for controlling the degree of deflection of liquid crystal molecules in the liquid crystal layer 300 is formed between a pixel electrode included in the pixel electrode layer 110 and a common electrode included in the common electrode layer 130 to implement a display function. For example, the opposite substrate 200 includes the black matrix 04 as shown in FIG. 6. It should be noted that, FIG. 9 only schematically illustrates the pixel electrode layer and the common electrode layer, but does not limit the specific structures of the pixel electrode layer and the common electrode layer.

For example, the display device provided by the embodiment of the present disclosure is an in-cell display device, that is, the inner detection electrodes and the outer detection electrodes in the detection substrate provided by any of the above embodiments are located inside the display panel. For example, the array substrate 100 is the detection substrate provided in any one of the above embodiments. For example, the common electrode layer 130 includes the inner detection electrode and the outer detection electrode in the detection substrate. That is, the inner detection electrode and the outer detection electrode in the detection substrate are multiplexed as the common electrode included in the common electrode layer 130, so the integration degree of the display device can be improved, and the display device can be made thinner and lighter.

In other embodiments, the inner detection electrode and the outer detection electrode in the detection substrate may be located outside the display panel.

In summary, in some embodiments of the present disclosure, the orthographic projection of the curved portion of the inner edge of the outer detection electrode protrudes into the region between the orthographic projections of the adjacent protrusion portions 32 included in the inner detection electrode 3, so the circumference of the inner detection electrode in the embodiment of the present disclosure is larger, and the inner detection electrode and the outer detection electrode have a large effective mutual capacitance value, which can improve the detection sensitivity of the detection substrate.

In other embodiments of the present disclosure, the inner detection electrodes of the first detection unit queue and the inner detection electrodes of the second detection unit queue are staggered in the arrangement direction of the signal lines, which is beneficial to avoid a part of the signal lines overlapping with the outer detection electrode but not the inner detection electrode, that is, it is beneficial to realize that each signal line overlaps with both the outer detection electrode and the inner detection electrode, thereby helping to reduce the transverse mura.

Embodiments of the same components in the embodiments of the detection substrate and the display device provided by the embodiments of the present disclosure may refer to each other. In case of no conflict, features in one embodiment or in different embodiments can be combined.

The foregoing descriptions are merely exemplary embodiments of the present disclosure, and are not intended to limit the protection scope of the present disclosure, which is determined by the appended claims.

What is claimed is:

1. A detection substrate, comprising a base substrate, at least one outer detection electrode, and at least one inner detection electrode, wherein the at least one outer detection electrode and the at least one inner detection electrode are on the base substrate, and the at least one outer detection electrode is insulated from the at least one inner detection electrode, the at least one outer detection electrode has at least one hollowed portion, the at least one hollowed portion corresponds to the at least one inner detection electrode, and at least one orthographic projection of the at least one inner detection electrode on the base substrate respectively overlaps with at least one region respectively surrounded by at least one orthographic projection of at least one edge of the at least one hollowed portion on the base substrate;

each inner detection electrode comprises a body portion and a plurality of protrusion portions protruding from the body portion and extend in directions away from the body portion; and the edge of each hollowed portion comprises a curved portion, an orthographic projection of the curved portion on the base substrate protrudes into a region between orthographic projections of at least two adjacent protrusion portions of the plurality of protrusion portions on the base substrate, a portion of the orthographic projection of the curved portion is closer to an orthographic projection of the body portion on the base substrate than top ends of the orthographic projections of the adjacent protrusion portions, and the top ends of the orthographic projections of the adjacent protrusion portions are end portions, away from the orthographic projection of the body portion, of the orthographic projections of the adjacent protrusion portions.

2. The detection substrate according to claim 1,
wherein each outer detection electrode has an integrated structure, and each outer detection electrode has a plurality of hollowed portions that are spaced apart from each other; and
the at least one inner detection electrode comprises a plurality of inner detection electrodes respectively corresponding to the plurality of hollowed portions.

3. The detection substrate according to claim 2, wherein the at least one outer detection electrode comprises a plurality of outer detection electrodes insulated from each other, and the plurality of inner detection electrodes comprise a plurality of inner detection electrode groups on the base substrate and insulated from each other,
wherein each of the inner detection electrode groups comprises a plurality of inner detection electrodes which are spaced apart from each other and respectively in one-to-one correspondence with the plurality of hollowed portions of at least one of the outer detection electrode, so that each of the inner detection electrode groups corresponds to the at least one of the outer detection electrode; and
inner detection electrodes in a same inner detection electrode group are electrically connected to each other, and inner detection electrodes in different inner detection electrode groups are insulated from each other.

4. The detection substrate according to claim 3, further comprising a detection circuit,
wherein the plurality of outer detection electrodes comprise a first outer detection electrode, and the plurality of inner detection electrode groups comprise a first inner detection electrode group corresponding to the first outer detection electrode;
the detection substrate comprises a first detection region, the first detection region is provided with the first outer detection electrode, the first inner detection electrode group, a first outer detection lead, and a first inner detection lead, and the first outer detection lead is insulated from the first inner detection lead;
the first outer detection electrode is electrically connected to the detection circuit through the first outer detection lead; and
the first inner detection electrode group is electrically connected to the detection circuit through the first inner detection lead, the first inner detection lead comprises a plurality of first sub-leads in parallel with each other and comprises a second sub-lead electrically connected to the plurality of first sub-leads, the plurality of first sub-leads are electrically connected to inner detection electrodes comprised in the first inner detection electrode group, and the plurality of first sub-leads are electrically connected to the detection circuit through the second sub-lead.

5. The detection substrate according to claim 4, wherein the second sub-lead is electrically connected to end portions, close to the detection circuit, of the plurality of first sub-leads.

6. The detection substrate according to claim 4, wherein an extension direction of the first outer detection lead is consistent with an extension direction of one of the first sub-leads of the first inner detection lead.

7. The detection substrate according to claim 4, wherein one of the first outer detection electrode and an inner detection electrode of the first inner detection electrode group is a touch sensing electrode and the other is a touch driving electrode.

8. The detection substrate according to claim 4,
wherein the plurality of outer detection electrodes comprise a second outer detection electrode, and the plurality of inner detection electrode groups comprise a second inner detection electrode group corresponding to the second outer detection electrode;
the detection substrate comprises a second detection region, the second detection region is provided with the second outer detection electrode, the second inner detection electrode group, a second outer detection lead, and a second inner detection lead, and the second outer detection lead is insulated from the second inner detection lead;
the second outer detection electrode is electrically connected to the detection circuit through the second outer detection lead; and
the second inner detection electrode group is electrically connected to the second inner detection lead, the second inner detection lead is electrically connected to the detection circuit, the second inner detection lead comprises a plurality of third sub-leads in parallel with each other, the plurality of third sub-leads are electrically connected to inner detection electrodes comprised in the second inner detection electrode group, the plurality of third sub-leads are electrically connected to the first outer detection electrode, so that the second inner detection electrode group is electrically connected to the detection circuit through the second inner detection lead, the first outer detection electrode, and the first outer detection lead.

9. The detection substrate according to claim 8, wherein the second inner detection lead further comprises a fourth sub-lead, and the plurality of third sub-leads are electrically connected to the first outer detection electrode through the fourth sub-lead.

10. The detection substrate according to claim 8, wherein both the first outer detection electrode and inner detection electrodes in the second inner detection electrode group are configured to function as one of a touch driving electrode and a touch sensing electrode, and both the second outer detection electrode and inner detection electrodes in the first inner detection electrode group are configured to function as the other of the touch driving electrode and the touch sensing electrode.

11. The detection substrate according to claim 2, further comprising a plurality of signal lines arranged in a sequence,
wherein orthographic projections of the plurality of signal lines on the base substrate overlap with an orthographic projection of the outer detection electrode on the base substrate,
the inner detection electrodes corresponding to the plurality of hollowed portions are arranged into a plurality of inner detection electrode queues, each of the inner detection electrode queues comprises at least two inner detection electrodes, and each of the inner detection electrode queues extends along an arrangement direction of the plurality of signal lines; and
the plurality of inner detection electrode queues comprise a first inner detection electrode queue and a second inner detection electrode queue that are sequentially arranged along an extension direction of the plurality of signal lines, the extension direction of the plurality of signal lines is different from the arrangement direction of the plurality of signal lines, and inner detection electrodes of the second inner detection electrode queue and inner detection electrodes of the first inner detection electrode queue are staggered in the arrangement direction of the plurality of signal lines.

12. The detection substrate according to claim 11, wherein an orthographic projection of each of the signal lines on the base substrate overlaps with the orthographic projection of the outer detection electrode on the base substrate, and overlaps with orthographic projections of a part of the inner detection electrodes corresponding to the plurality of hollowed portions on the base substrate.

13. The detection substrate according to claim 12, wherein an area of overlapping regions, where the orthographic projections of respective the signal lines overlap with the orthographic projection of the outer detection electrode, is equal to an area of overlapping regions, where the orthographic projections of the respective the signal lines overlap with the orthographic projection of the part of the inner detection electrodes.

14. The detection substrate according to claim 1, wherein a shape of the orthographic projection of the edge of each hollowed portion is a closed shape.

15. The detection substrate according to claim 1,
wherein the orthographic projection of each inner detection electrode is L-shaped or T-shaped or cross-shaped; or,
the orthographic projection of each inner detection electrode has 4+n protrusion portions, and n≥1.

16. The detection substrate according to claim 1, wherein the at least one outer detection electrode and the at least one inner detection electrode are arranged on the base substrate side by side.

17. The detection substrate according to claim 1,
wherein one of the outer detection electrode and the inner detection electrode is a touch driving electrode and the other of the outer detection electrode and the inner detection electrode is a touch sensing electrode.

18. A detection substrate, comprising a base substrate, a plurality of detection units on the base substrate, and a plurality of signal lines arranged in a sequence on the base substrate,
wherein each of the detection units comprises an outer detection electrode and an inner detection electrode, the outer detection electrode has a hollowed portion, the hollowed portion corresponds to the inner detection electrode, and an orthographic projection of the inner detection electrode on the base substrate overlaps with a region surrounded by an orthographic projection of an edge of the hollowed portion on the base substrate;
orthographic projections of the plurality of signal lines on the base substrate overlap with orthographic projections of the plurality of detection units on the base substrate;
the plurality of detection units comprise a first detection unit queue and a second detection unit queue that are sequentially arranged along an extension direction of the plurality of signal lines, the first detection unit queue and the second detection unit queue both comprise at least two detection units and both extend along an arrangement direction of the plurality of signal lines, and the arrangement direction of the plurality of signal lines is different from the extension direction of the plurality of signal lines;
inner detection electrodes of the second detection unit queue and inner detection electrodes of the first detection unit queue are staggered in the arrangement direction of the plurality of signal lines;
the inner detection electrode comprises a body portion and a plurality of protrusion portions protruding from the body portion and extend in directions away from the body portion; and
the edge of the hollowed portion comprises a curved portion, an orthographic projection of the curved portion on the base substrate protrudes into a region between orthographic projections of at least two adjacent protrusion portions of the plurality of protrusion portions on the base substrate, a portion of the orthographic projection of the curved portion is closer to an orthographic projection of the body portion on the base substrate than top ends of the orthographic projections of the adjacent protrusion portions, and the top ends of the orthographic projections of the adjacent protrusion portions are end portions, away from the orthographic projection of the body portion, of the orthographic projections of the adjacent protrusion portions.

19. The detection substrate according to claim 18, wherein outer detection electrodes of the first detection unit queue are directly connected to outer detection electrodes of the second detection unit queue.

20. A display device, comprising the detection substrate which comprises a base substrate, at least one outer detection electrode, and at least one inner detection electrode,
wherein the at least one outer detection electrode and the at least one inner detection electrode are on the base substrate, and the at least one outer detection electrode is insulated from the at least one inner detection electrode,
the at least one outer detection electrode has at least one hollowed portion, the at least one hollowed portion corresponds to the at least one inner detection electrode, and at least one orthographic projection of the at least one inner detection electrode on the base substrate respectively overlaps with at least one region respectively surrounded by at least one orthographic projection of at least one edge of the at least one hollowed portion on the base substrate;
each inner detection electrode comprises a body portion and a plurality of protrusion portions protruding from the body portion and extending in directions away from the body portion; and
the edge of each hollowed portion comprises a curved portion, an orthographic projection of the curved portion on the base substrate protrudes into a region between orthographic projections of at least two adjacent protrusion portions of the plurality of protrusion portions on the base substrate, a portion of the orthographic projection of the curved portion is closer to an orthographic projection of the body portion on the base substrate than top ends of the orthographic projections of the adjacent protrusion portions, and the top ends of the orthographic projections of the adjacent protrusion portions are end portions, away from the orthographic projection of the body portion, of the orthographic projections of the adjacent protrusion portions.

* * * * *